(12) United States Patent
Lepercq et al.

(10) Patent No.: US 12,473,833 B2
(45) Date of Patent: Nov. 18, 2025

(54) MANUFACTURE OF FIBRE-REINFORCED COMPOSITE HYDROFOILS AND AEROFOILS AND ELONGATE FOIL

(71) Applicant: North Thin Ply Technology Sarl, Renens (CH)

(72) Inventors: Xavier Lepercq, Renens (CH); Gerard Gautier, Renens (CH); Thomas Ricard, Renens (CH); Olivier Thomassin, Renens (CH); Francois Mordasini, Renens (CH); Jonathan Merlet, Renens (CH)

(73) Assignee: North Thin Ply Technology Sarl, Renens (CH)

( * ) Notice: Subject to any disclaimer, the term of this patent is extended or adjusted under 35 U.S.C. 154(b) by 9 days.

(21) Appl. No.: 18/580,642

(22) PCT Filed: Aug. 10, 2022

(86) PCT No.: PCT/EP2022/072488
§ 371 (c)(1),
(2) Date: Jan. 19, 2024

(87) PCT Pub. No.: WO2023/020918
PCT Pub. Date: Feb. 23, 2023

(65) Prior Publication Data
US 2025/0084767 A1     Mar. 13, 2025

(30) Foreign Application Priority Data

Aug. 16, 2021 (GB) .................................. 2111731

(51) Int. Cl.
*F01D 5/28* (2006.01)
*B29C 70/22* (2006.01)
(Continued)

(52) U.S. Cl.
CPC .............. *F01D 5/282* (2013.01); *B29C 70/22* (2013.01); *B29C 70/30* (2013.01); *B32B 5/024* (2013.01);
(Continued)

(58) Field of Classification Search
CPC ......... F01D 5/282; F01D 5/141; B32B 7/022; B32B 5/263; B32B 5/024; B32B 5/12;
(Continued)

(56) References Cited

U.S. PATENT DOCUMENTS

| 5,375,978 A | 12/1994 | Evans et al. |
| 10,465,703 B2 * | 11/2019 | Pope .................... F04D 29/388 |
| 2012/0109594 A1 | 5/2012 | Grape et al. |

FOREIGN PATENT DOCUMENTS

KR        102004977 B1     7/2019

OTHER PUBLICATIONS

Combined Search and Examination Report under Sections 17 and 18(3) in related GB application 2111731.2 issued on Feb. 16, 2022.
(Continued)

*Primary Examiner* — Nathaniel E Wiehe
*Assistant Examiner* — Theodore C Ribadeneyra
(74) *Attorney, Agent, or Firm* — POLSINELLI PC

(57) ABSTRACT

An elongate foil, selected from a hydrofoil and an aerofoil, having a body of laminated plies of fibre-reinforced resin matrix composite material, wherein the body has a central internal surface, extending between opposite longitudinal ends of the elongate foil, at which opposite first and second side parts of the elongate foil, which is curved along the length of the elongate foil and each first and second side part defines a respective opposite first or second foil surface, are bonded together, wherein each first and second side part of the elongate foil comprises a respective first or second laminated stack of plies of fibrous reinforcement, whereby
(Continued)

the first foil surface has a first curved contour profile along a length of the elongate foil and a second curved contour profile transverse to the length of the elongate foil, each of the first and second curved contour profiles being formed by varying the number of plies of fibrous reinforcement at positions along the respective contour profile, and the second foil surface has a third curved contour profile along the length of the elongate foil and a fourth curved contour profile transverse to the length of the elongate foil, each of the third and fourth curved contour profiles being formed by varying the number of plies of fibrous reinforcement at positions along the respective contour profile. Also disclosed is a method of manufacturing an elongate foil.

12 Claims, 5 Drawing Sheets

(51) Int. Cl.
| | |
|---|---|
| *B29C 70/30* | (2006.01) |
| *B32B 5/02* | (2006.01) |
| *B32B 5/12* | (2006.01) |
| *B32B 5/26* | (2006.01) |
| *B32B 7/022* | (2019.01) |
| *F01D 5/14* | (2006.01) |
| *B29L 31/08* | (2006.01) |

(52) U.S. Cl.
CPC .............. *B32B 5/12* (2013.01); *B32B 5/263* (2021.05); *B32B 7/022* (2019.01); *F01D 5/141* (2013.01); *B29K 2995/0077* (2013.01); *B29L 2031/082* (2013.01); *B32B 2250/20* (2013.01); *B32B 2250/44* (2013.01); *B32B 2255/02* (2013.01); *B32B 2260/023* (2013.01); *B32B 2260/046* (2013.01); *B32B 2307/54* (2013.01); *B32B 2605/12* (2013.01); *B32B 2605/18* (2013.01); *F05D 2230/90* (2013.01); *F05D 2300/603* (2013.01)

(58) Field of Classification Search
CPC ............ B32B 2250/20; B32B 2250/44; B32B 2255/02; B32B 2260/023; B32B 2260/046; B32B 2307/54; B32B 2605/12; B32B 2605/18; B29C 70/22; B29C 70/30; B29K 2995/077; B29L 2031/082; F05D 2230/90; F05D 2300/603
See application file for complete search history.

(56) References Cited

OTHER PUBLICATIONS

International Search Report and Written Opinion in related international application PCT/EP2022/072488 issued on Dec. 8, 2022.
Manudha, Herath T et al., "Structural Strength and Laminate Optimization of Self-Twisting Composite Hydrofoils Using a Genetic Algorithm", Composite Structures, Elsevier Science Ltd., vol. 176, May 19, 2017, pp. 359-378.

* cited by examiner

MANUFACTURE OF FIBRE-REINFORCED COMPOSITE HYDROFOILS AND AEROFOILS AND ELONGATE FOIL

FIELD OF THE INVENTION

The present invention relates to a method of manufacturing a foil, selected from a hydrofoil and an aerofoil, comprised of a fibre-reinforced resin matrix composite material. The present invention also relates to an elongate foil, selected from a hydrofoil and an aerofoil, comprising a body comprised of laminated plies of fibre-reinforced resin matrix composite material. The foil manufactured by the method of the present invention, and the elongate foil of the present invention, may be in the form of a foil comprising a "finished" foil having final foil surfaces to be deployed in use, or comprising a "structural" foil having one or more structural surfaces onto which a fairing, defining a hydrofoil or aerofoil surface, may be affixed.

BACKGROUND OF THE INVENTION

It is commonly known in the art to manufacture foils, such as aerofoils and hydrofoils, comprised of fibre-reinforced resin matrix composite material.

In this specification the term "foil" means a solid object which is shaped such that when the object is placed in a moving fluid at a suitable angle of attack, the lift, which is a force generated perpendicular to the fluid flow, is substantially larger than the drag, which is a force generated parallel to the fluid flow. If the fluid is a gas, the foil is called an aerofoil or airfoil, and for simplicity and convenience the single term "aerofoil" is used throughout this specification to encompass such foils. If the fluid is a liquid such as water, the foil is called a hydrofoil. Aerofoils may be exemplified by a variety of different structures and components that are typically placed on vehicles, such as aircraft (e.g. wings and parts thereof, propellors, rotor blades, etc.), and automotive vehicles (e.g. spoilers, aerofoil wings for sports cars, etc.). Hydrofoils may be exemplified by a variety of different structures and components that are typically placed on marine vessels (e.g. hydrofoils affixed to a hull, keels, centreboards, skegs, rudders, etc.).

For marine vessels, particularly racing sailboats, a hydrofoil is an appendage affixed to the hull that creates a combination of (i) anti-drift force to counteract any lateral drift caused by the sails and (ii) positive upwards vertical lift to reduce the wetted area of the sailboat's hull and improve its speed and performance or negative downwards vertical lift to compensate the upwards vertical lift generated by kites on kite boats and prevent the boat from take-off.

Conventionally, simple anti-drift appendages are manufactured using complex hollow structures, or sandwich structures, composed of composite materials, such as fibre-reinforced resin matrix composite material. Recently, with advancements in sailboat performance the mechanical loads applied to these hydrofoils, and the mechanical stresses consequently induced in them, has guiding hydrofoil designs to the use of monolithic solutions, typically consisting of i.e. carbon- or glass-fibre reinforced thermoset and/or thermoplastics materials. A monolithic composite foil comprises a single body of fibre-reinforced resin matrix composite material, which does not comprise a sandwich structure having a central core and does not include a central hollow cavity.

With such monolithic hydrofoil designs, it is important for the fibres in the fibrous reinforcement to have substantially perfect fibre alignment and positioning to guarantee the mechanical strength and fatigue resistance of the hydrofoil. A high quality composite material, comprising highly accurate fibre alignment, both in plane and out of plane, most preferably 100% accurate (i.e. "perfect") fibre alignment, and having low porosity, has become a key element in the successful manufacture and performance of monolithic hydrofoil designs.

Many hydrofoils have a complex geometrical shape which means that it is difficult to manufacture the hydrofoil as a monolithic structure composed of fibre-reinforced resin matrix composite material. The complex geometrical shape typically has complex curvature, with curvature being present in two different non-parallel axial directions.

For example, FIG. 1 shows a front view of a typical known hydrofoil for fitting to the hull of marine vessel. The hydrofoil 2 is elongate and has a shaft 4 at one end, a tip 6 at the opposite end and a middle elbow 8 therebetween. For clarity, fittings to the hull are not shown. The hydrofoil 2 has a first curvature along the length extending between the shaft 4 and the tip 6, and the middle elbow 8 has high curvature. The curvature illustrated in FIG. 1 is about an axis which is orthogonal to the length of the hydrofoil 2 and, if the two-dimensional shape of the length of the hydrofoil shown in FIG. 1 is defined as being in the x-y plane of an orthogonal x-y-z coordinate system (which x-y plane is within the plane of FIG. 1), then the axis is along the z-direction (which extends into the plane of FIG. 1).

FIG. 2 shows a cross-section of the hydrofoil of FIG. 1 taken along the line A-A. The hydrofoil 2 comprises two opposite foil surfaces 10, 12. Each foil surface 10, 12 has a respective complex curvature, with the first curvature being along the respective surface 10, 12 as illustrated in FIG. 1 and a second curvature being across the respective surface 10, 12 as illustrated in FIG. 2. The curved foil surfaces 10, 12 each have a respective different curvature has which is about one or more axes that are within, or parallel to, the x-y plane of the orthogonal x-y-z coordinate system.

One particular problem with the manufacture of parts having complex curvature composed of a fibre-reinforced resin matrix composite material is that the composite material is typically manufactured by laying up of a stack of unidirectional (UD) plies at 0° and +−45°. UD plies are preferred as they exhibit higher strength and modulus properties than woven fabric as the UD plies allow lower resin content and do not exhibit crimp (i.e. waviness of the fibres). The double curvature especially in the area of the middle elbow 8 makes it hard to drape a UD ply. When the preform is laid against a mould surface having a complex curvature, it is difficult to maintain the accuracy of fibre alignment in the preform, the fibres can become distorted, and often wrinkles or kinks are formed in the plies. This is amplified in the case of use of a preform consisting of multiaxial plies, for example having fibre orientations of 0°/+45°/−45°. This result in poor fibre alignment in the moulded part and poor mechanical performance. Sometime individual preform layers are cut into a plurality of adjacent or overlapping sections to try to reduce fibre distortion, so that a single layer is formed from a "jigsaw" of multiple perform parts, which may potentially overlap, in an effort to adapt the preform to complex curvature with minimum fibre distortion. However, this modification complicates the production process and reduces the uniformity of fibre distribution, worsens the orientation and increases the areal weight in the moulded product, which may lead to undesired stress concentrations, and poor mechanical performance.

A number of different manufacturing techniques are known in the art to produce such a hydrofoil having complex curvature about multiple non-parallel axes. Known methods have tried to minimise the risk of poor fibre alignment.

As illustrated in FIGS. 3 and 4, in one typical known process, an upper half-part 14 of the hydrofoil 2 and a lower half-part 16 of the hydrofoil 2 are individually and separately moulded. The two half-parts 14, 16 each have an outer foil surface 18, 20 having complex curvature. The foil surface 18, 20 of each half-part 14, 16 is moulded using a respective mould tool 22, 24 to define the shape and dimensions of the respective half-part 14, 16. Each half-part 14, 16 has a substantially planar inner surface 26, 28 remote from the respective mould tool 22, 24. Then the inner surfaces 26, 28 of the two moulded half-parts 22, 24 are bonded together about a central bond line 30 which is typically located at the neutral axis of the hydrofoil 2.

In FIGS. 3 and 4, the two half-parts 14, 16 are formed by laying-up of preform layers 32 in the respective mould tool 22, 24. Various lay-up structures may be employed. In the illustrated example, outer preform layers are laid-up against the moulding surface of the respective mould tool 22, 24 and the central part of the half-parts 14, 16 is formed by building up further preform layers. Optionally, a core material (not shown) may be located within each half-part 14, 16.

In this known process, the moulded foil surfaces 18, 20 having complex curvature which form the outer surface of the final hydrofoil 2 can be accurately moulded to the desired shape by the mould surfaces of the respective mould tool 22, 24. However, the inner surfaces 26, 28 which are not moulded against a mould tool surface are difficult to shape accurately and precisely. Consequently, in some manufactured hydrofoils the bonding between the two inner surfaces 26, 28 at the central bond line 30 is not optimal, and can also suffer from the problem of air being inadvertently trapped at the interface of the two inner surfaces 26, 28, leading to localized porosity and a weakened central bond line 30. Accordingly, the bond between the two half-parts 14, 16 may cause the hydrofoil 2 to exhibit poor mechanical performance.

This known process also requires two mould tools 22, 24 to be produced, each of which has a respective mould surface with complex curvature. This increases the cost and timescale of the hydrofoil manufacturing process.

Furthermore, this known process can cause misalignment of the fibres during the lay-up and moulding process, which can significantly reduce the mechanical properties of the resultant composite material foil.

An aim of the present invention is therefore at least partially to overcome one or more of the above-described problems encountered by known methods for the manufacture of composite material foils having outer surfaces with complex curvature.

Another aim of the present invention is to reduce the manufacturing time and environmental footprint as compared to such known methods.

The present invention accordingly aims to provide an improved manufacturing method for a foil comprised of a fibre-reinforced resin matrix composite material, in particular in which the foil can comprise outer surfaces with complex curvature and can exhibit high quality mechanical properties, and which can be manufactured at low cost and with small lead times for the associated tooling.

Most particularly, the present invention aims to provide an improved manufacturing method for a foil comprised of a fibre-reinforced resin matrix composite material, which can be manufactured reliably, consistently and repeatably to provide, in a low cost and quick production method with a low environmental footprint, a foil, such as a hydrofoil or an aerofoil, having opposite outer surfaces having complex curvature, with uniformly controlled material properties throughout the foil and accurate control of fibre alignment throughout the foil, which in turn can provide that the foil exhibits high quality mechanical properties.

SUMMARY OF THE INVENTION

The present invention provides a method of manufacturing a foil comprised of a fibre-reinforced resin matrix composite material.

In one embodiment, a method of manufacturing a foil, selected from a hydrofoil and an aerofoil, comprised of a fibre-reinforced resin matrix composite material, the method comprising the steps of:
  a) providing an elongate moulding tool having a mould surface which extends along, and is curved along, a length direction of the elongate moulding tool, the length direction extending between opposite first and second ends of the elongate moulding tool;
  b) providing a plurality of preform layers, each preform layer comprising a fibrous reinforcement at least partly impregnated by a resin, each preform layer having a respective two-dimensional shape and dimensions;
  c) positioning a first preform layer on the mould surface;
  d) sequentially positioning further preform layers on the first preform layer to build-up an elongate first shaped body comprising a first laminated stack of preform layers on the mould surface, the first shaped body having an inner surface in contact with the mould surface, whereby an outer surface of the first shaped body, remote from the mould surface, has a first curved contour profile along a length of the first shaped body and a second curved contour profile transverse to the length of the first shaped body, each of the first and second curved contour profiles being formed by varying the number of preform layers at positions along the respective contour profile;
  e) curing the first shaped body to form a first foil part comprised of a fibre-reinforced resin matrix composite material formed from the preform layers;
  f) removing the first foil part from the mould surface to expose the inner surface;
  g) sequentially positioning further preform layers on the inner surface to build-up an elongate second shaped body on the first foil part to form an elongate unitary body having a length defined between opposite longitudinal ends of the unitary body, the unitary body being curved along the length of the unitary body, wherein the second shaped body comprises a second laminated stack of preform layers on the inner surface, whereby an outer surface of the second shaped body, remote from the inner surface of the first foil part, has a third curved contour profile along a length of the second shaped body and a fourth curved contour profile transverse to the length of the second shaped body, each of the third and fourth curved contour profiles being formed by varying the number of preform layers at positions along the respective contour profile; and
  h) curing the second shaped body on the first foil part comprising the elongate unitary body to form an elongate foil, selected from a hydrofoil and an aerofoil, comprised of a fibre-reinforced resin matrix composite material formed from the preform layers.

In one embodiment, the mould surface is parallel to an axis which is orthogonal to the length direction of the elongate moulding tool.

In one embodiment, the mould surface is concave along the length direction of the elongate moulding tool.

In one embodiment, the mould surface has a middle portion having a first curvature, along the length direction of the elongate moulding tool, located between opposite end portions which respectively have second and third curvatures along the length direction of the elongate moulding tool, wherein the first curvature has a smaller radius than the second and third curvatures.

In one embodiment, the middle portion defines an elbow-shape between the opposite end portions.

In one embodiment, the elongate foil has opposite curved surfaces which are respectively formed from the outer surfaces of the first and second shaped bodies.

In one embodiment, the opposite curved surfaces are each curved about at least two axes which are mutually inclined.

In one embodiment, the opposite curved surfaces are each curved about at least two axes which are mutually orthogonal.

In one embodiment, further comprising the step, before curing step (e) or (h) respectively, of applying a coating layer to the outer surface of at least one of, or both of, the first and second shaped bodies, optionally wherein the coating layer comprises a gelcoat layer and/or a woven or biaxial fabric.

In one embodiment, further comprising the step, after step (h), of smoothing the opposite curved surfaces of the elongate foil.

In one embodiment, the second curved contour profile has a different shape and dimensions at different locations along the length of the first shaped body, and/or the fourth curved contour profile has a different shape and dimensions at different locations along the length of the second shaped body.

In one embodiment, the first laminated stack of preform layers includes preform layers comprising different fibrous reinforcements and/or the second laminated stack of preform layers includes preform layers comprising different fibrous reinforcements, wherein the different fibrous reinforcements differ with respect to fibre orientation, fibre weight per unit area, weave pattern of a woven fabric forming the fibrous reinforcement, or fibre composition, or any two or more thereof.

In one embodiment, the first laminated stack of preform layers, and/or the second laminated stack of preform layers, includes at least one preform layer having a different fibrous reinforcement from at least one adjacent preform layer in the respective laminated stack, whereby, after step (g) the different fibrous reinforcement forms a localized region having an increased fibre reinforcement property in the elongate foil.

In one embodiment, the first laminated stack of preform layers, and/or the second laminated stack of preform layers, includes a plurality of outer preform layers of the respective laminated stack having fibrous reinforcement with increased tensile strength or compressive strength as compared to fibrous reinforcement in a plurality of interior preform layers of the respective laminated stack.

In one embodiment, the first and second preform parts are bonded together to form the elongate foil by the resin in the preform layers.

In one embodiment, the the elongate foil is a monolithic body consisting of laminated plies of the fibre-reinforced resin matrix composite material formed from the preform layers, and optionally at least one coating layer on an outer surface of the monolithic body.

In one embodiment, each preform layer is shaped and dimensioned so that when the preform layer is sequentially positioned to build-up the respective first or second shaped body respectively comprising the first or second laminated stack of preform layers, each preform layer has a peripheral edge which lies within a peripheral edge of the preform layer located thereunder in the respective laminated stack.

The present invention further provides an elongate foil.

In another embodiment, an elongate foil, selected from a hydrofoil and an aerofoil, comprising a body comprised of laminated plies of fibre-reinforced resin matrix composite material, wherein the body has a central internal surface, extending between opposite longitudinal ends of the elongate foil, at which opposite first and second side parts of the elongate foil, which is curved along the length of the elongate foil and each first and second side part defines a respective opposite first or second foil surface, are bonded together, wherein each first and second side part of the elongate foil comprises a respective first or second laminated stack of plies of fibrous reinforcement, whereby the first foil surface has a first curved contour profile along a length of the elongate foil and a second curved contour profile transverse to the length of the elongate foil, each of the first and second curved contour profiles being formed by varying the number of plies of fibrous reinforcement at positions along the respective contour profile, and the second foil surface has a third curved contour profile along the length of the elongate foil and a fourth curved contour profile transverse to the length of the elongate foil, each of the third and fourth curved contour profiles being formed by varying the number of plies of fibrous reinforcement at positions along the respective contour profile.

In another embodiment, the central internal surface is curved along the length of the elongate foil and is parallel to an axis which is orthogonal to the length direction of the elongate foil.

In another embodiment, the central internal surface is coincident with the neutral axis of the elongate foil.

In another embodiment, the first foil surface is concave along the length direction of the elongate foil and the second foil surface is convex along the length direction of the elongate foil.

In another embodiment, the elongate foil has a middle part having a first curvature, along the length direction of the elongate foil, located between opposite end parts which respectively have second and third curvatures along the length direction of the elongate foil, wherein the first curvature has a smaller radius than the second and third curvatures.

In another embodiment, the middle part defines an elbow-shape between the opposite end parts.

In another embodiment, the opposite first and second foil surfaces are each curved about at least two axes which are mutually inclined.

In another embodiment, the opposite first and second foil surfaces are each curved about at least two axes which are mutually orthogonal.

In another embodiment, the elongate foil further comprising a coating layer applied to an outer surface of the body on at least one of, or both of, the first and second foil surfaces.

In another embodiment, the second curved contour profile has a different shape and dimensions at different locations along the length of the first foil surface, and/or the fourth curved contour profile has a different shape and dimensions at different locations along the length of the second foil surface.

In another embodiment, the first laminated stack includes plies of different fibrous reinforcements and/or the second laminated stack includes plies of different fibrous reinforcements, wherein the different fibrous reinforcements differ with respect to fibre orientation, fibre weight per unit area, weave pattern of a woven fabric forming the fibrous reinforcement, or fibre composition, or any two or more thereof.

In another embodiment, the first laminated stack, and/or the second laminated stack, includes at least one ply having a different fibrous reinforcement from at least one adjacent ply in the respective laminated stack, whereby, the different fibrous reinforcement forms a localized region having an increased fibre reinforcement property in the elongate foil.

In another embodiment, the first laminated stack, and/or the second laminated stack, includes a plurality of outer plies of the respective laminated stack having fibrous reinforcement with increased tensile strength or compressive strength as compared to fibrous reinforcement in a plurality of interior plies of the respective laminated stack.

In another embodiment, the first and second side parts are bonded together to form the elongate foil by the resin in the resin matrix of the fibre-reinforced resin matrix composite material.

In another embodiment, in the first and second laminated stacks, each ply is shaped and dimensioned so that each ply has a peripheral edge which lies within a peripheral edge of the ply located thereunder, in a direction towards the central internal surface, in the respective laminated stack.

In another embodiment, the elongate foil is a monolithic body consisting of laminated plies of the fibre-reinforced resin matrix composite material formed from the preform layers, and optionally at least one coating layer on an outer surface of the monolithic body.

As stated above, the foil manufactured by the method of the present invention, and the elongate foil of the present invention, may be in the form of a foil comprising a "finished" foil having final foil surfaces to be deployed in use, or comprising a "structural" foil having one or more structural surfaces onto which a fairing, defining a hydrofoil or aerofoil surface, may be affixed.

The preferred embodiments of the present invention can provide a method of manufacturing an elongate foil in which the outer surfaces of the elongate foil along the length of the foil can have a complex curvature, i.e. curvature about two non-parallel axes.

Despite such a complex curvature, the orientation of the fibres can remain constant relative to an initial moulding surface which has a predefined simple curvature about a single axis, or about two or more parallel axes. Even though some relatively long fibres may individually extend along the entire length of the elongate foil, the fibre alignment may be precisely controlled, and maintained in parallel with the moulding surface.

The present invention can manufacture a foil having a complex geometry by without requiring a complex mould which would require a preliminary complicated and time-consuming mould manufacturing process. Consequently, the present invention can reduce the manufacturing time and environmental footprint as compared to known methods which require the design and production of a complex mould.

The present invention has a particular application for the manufacture of monolithic foils, although other non-monolithic foil parts, components or structures may also be manufactured according to the present invention.

The present invention can manufacture foils having enhanced mechanical properties, but also which are made at a lower cost, smaller lead time and a lower environmental footprint as compared to some known foil manufacturing processes as described above.

The preferred embodiments of the method of the present invention build-up preform laminate structures from pre-shaped preforms, and the manufacturing process is very compatible with automation and kitting technologies.

This technical effect and advantage to achieve highly consistently accurate fibre orientation and alignment of such long fibres in an elongate foil formed from a plurality of preform layers is believed by the present inventors to be unique in the composite material art, and allows to increase the performance of fibre-reinforced composite foil structures for applications where product consistency is a key design and performance factor.

The geometry of the external foil surfaces can have a complex shape, in particular a complex curvature about multiple non-parallel axes and can incorporate one or any combination of the following geometric or structural features: different curvatures applied to the opposite foil surfaces; different radii of curvatures applied to the leading and trailing edges of the foil; varying foil thickness along the length of the coil; foil surfaces with increasing or/and decreasing or/and neutral slope along the length of, or across the width of, the foil; one or multiple bumps or protrusions, ledges, depressions in either or both opposite foil surfaces; a section of any shape which can vary along the length of the foil.

The preferred embodiments of the present invention can provide a method of manufacturing an elongate foil in which a unitary body having a complex geometry is formed. The unitary body comprises a second shaped body on a first foil part formed from a first shaped body which has been cured to form the first foil part. The first and second shaped bodies used to make the unitary body have a near net shape as compared to the final elongate foil, for example the shaped body dimensions are within a given tolerance of the final foil dimensions. Each shaped body, comprising a respective laminated stack of preforms, is individually and independently cured in the sequence of steps to form the elongate foil. Consequently, the elongate foil can be manufactured by building up the first shaped body on the elongate moulding tool, then building up the second shaped body on the cured first foil part formed from the first shaped body to form the unitary body, and curing the second shaped body in the unitary body to form the second foil part bonded to the first foil part, which can be achieved with very little waste and in a fully automated way, thus improving productivity and repeatability.

The moulding tool has a simple geometry and defines, directly or indirectly, the shape and configuration of the inner bonded surfaces of the first and second foil parts. Consequently, the moulding tool can be used for manufacturing foils having different external foil surfaces, and can be used repeatedly to manufacture foils having different external foil surfaces. Only one moulding tool is used to manufacture each foil and the moulding tool is simple and inexpensive to manufacture. In contrast, known foil manufacturing processes typically require one or two mould tools per foil, and therefore two or four mould tools per pair of foils, having complicated geometry which are expensive, and time-consuming to manufacture and can only be used for a single foil design. Furthermore, such known mould tools are environmentally unfriendly because they are generally made of carbon-fibre reinforced polymer (CFRP). By removing the need for complex and excessive tooling, the present invention can therefore also provide a huge technical and commercial gain for the manufacture of prototype foils, or one-off foil designs, while still guaranteeing maximum foil performance and foil properties.

The preferred embodiments of the present invention can provide a method of manufacturing an elongate foil in which even though the cross-section of the foil changes along the length of the foil and across the width of the foil to provide opposite foil surfaces having complex curvature, the preforms used to form the foil remain parallel to the moulding surface of the moulding tool which has simple curvature. Accordingly, wrinkles and fibre misalignment can be avoided or minimized in the elongate foil. The resultant elongate foil comprised of the fibre-reinforced resin matrix composite material can reliably, and consistently and repeatably, exhibit a high-quality mechanical performance, and visual appearance. The fibre orientation and alignment along the entire length of the elongate foil can be maintained within the desired close tolerances in order to achieve high mechanical properties.

The preferred embodiments of the present invention can also provide a high level of automation, and a low level of, or no, manual intervention during the manufacturing process which accommodates changes in the geometry of the elongate foil along its length and across its width. The manufacturing cost and complexity is reduced, and the uniformity of plural elongate foils is increased, as compared to known manufacturing methods.

The preferred embodiments of the present invention can also avoid or minimize preform waste. In the preferred embodiments of the present invention, the shape and configuration of the or each preform layer is pre-calculated prior to the lay-up of the preform, based on parameters of the combination of the thickness of the preform layer, and the foil surface geometry, to provide a complex preform geometry. By pre-calculating such a preform shape prior to the lay-up step, the nesting of the integrality of the foil can be automated and waste minimized, because the preform layer is cut and subsequently laid-up and then moulded to a "near net shape" which obviates or minimizes waste generation during or after the lay-up and moulding steps. Reducing the waste increases the cost competitiveness, and further reduces the environmental footprint, of the preferred embodiments of the present invention.

In summary, the preferred embodiments of the present invention can also provide a highly flexible automated manufacturing method for making complex elongate foils composed of composite material.

The elongate foils produced by the preferred embodiments of the present invention can be used for various final applications, such as for boats, automotive vehicles, aircraft, etc., or any other high quality composite material foil product, from a fibre-reinforced resin matrix composite material, in particular a glass or carbon fibre composite material.

BRIEF DESCRIPTION OF THE DRAWINGS

Other features and advantages of the present invention will appear more clearly from the detailed description of several non-limiting embodiments of the invention which are illustrated by way of example only in the attached drawings, in which.

DETAILED DESCRIPTION OF EMBODIMENTS OF THE INVENTION

Referring to FIGS. 5 to 12, there is illustrated a method of manufacturing a foil, selected from a hydrofoil and an aerofoil, comprised of a fibre-reinforced resin matrix composite material according to an embodiment of the present invention. As stated above, the foil manufactured by the method of the present invention, and the elongate foil of the present invention, described hereinafter may be in the form of a foil comprising a "finished" foil having final foil surfaces to be deployed in use, or comprising a "structural" foil having one or more structural surfaces onto which a fairing (not shown), defining a hydrofoil or aerofoil surface, may be affixed.

Figure 1:
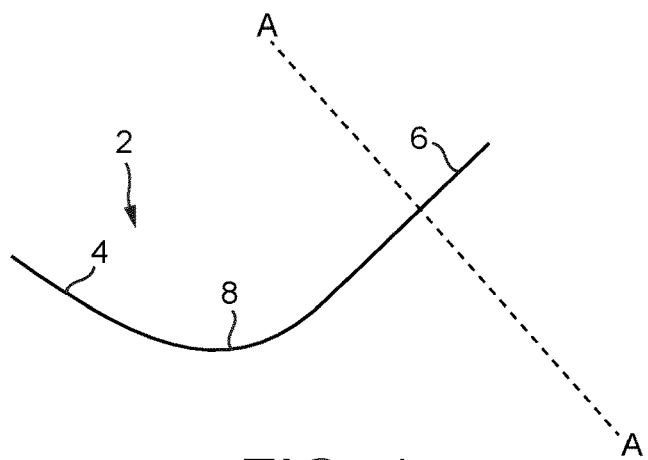
FIG. 1 is a schematic front view of a typical known hydrofoil for fitting to the hull of a marine vessel.
Figure 2:
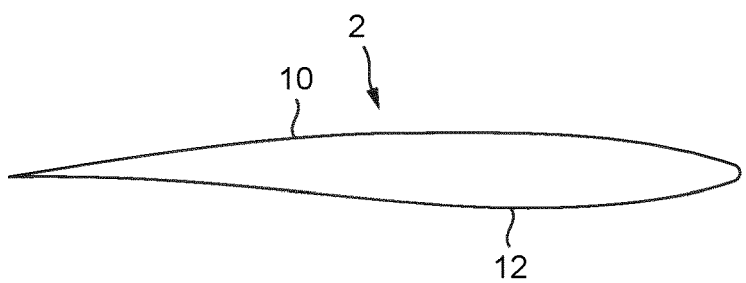
FIG. 2 shows a cross-section of the hydrofoil of FIG. 1 taken along the line A-A.
Figure 3:
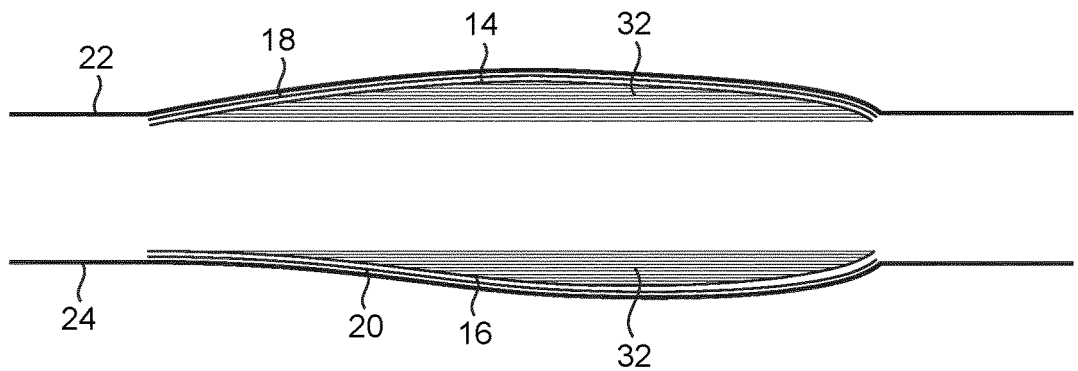
FIGS. 3 and 4 schematically illustrate steps taken in one known method for manufacturing the hydrofoil of FIG. 1.
Figure 4:
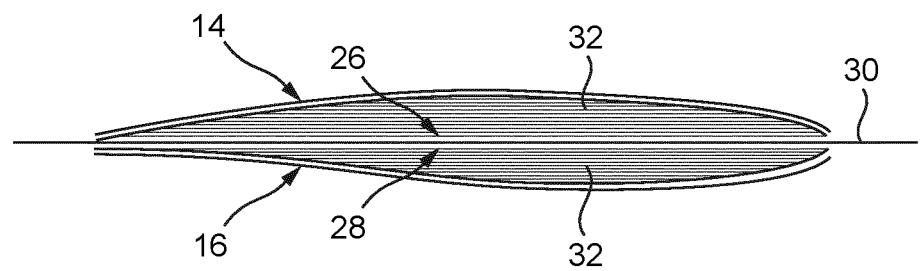
Figure 5:
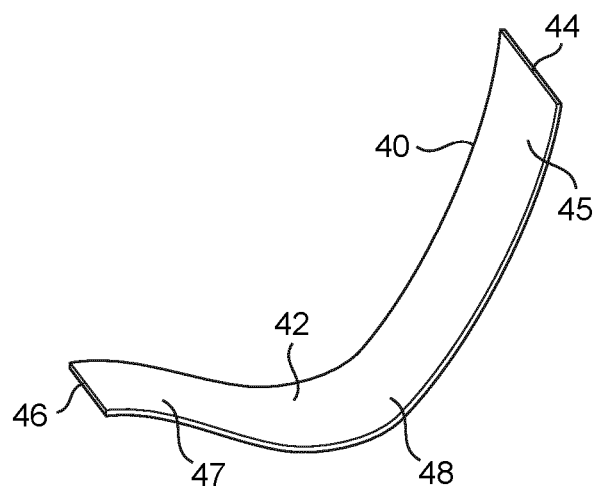
FIG. 5 is a schematic perspective view of an elongate moulding tool for use in a method of manufacturing an elongate foil comprised of a fibre-reinforced resin matrix composite material in accordance with an embodiment of the present invention.

In the method of the preferred embodiment of the present invention, an elongate moulding tool 40 is provided, for example as illustrated in FIG. 5. The elongate moulding tool 40 has a mould surface 42 which extends along, and is curved along, a length direction of the elongate moulding tool 40. The length direction extends between opposite first and second ends 44, 46 of the elongate moulding tool 40.

In other words, when proceeding along the length of the mould surface 42, the mould surface 42 is curved, and therefore is non-planar in the length direction. The curvature is about a plurality of parallel axes that are orthogonal to the length direction of the elongate moulding tool 40.

The mould surface 42 is parallel to an axis which is orthogonal to the length direction of the elongate moulding tool 40.

In other words, when proceeding across the width of the mould surface 42, the mould surface 42 is linear and not curved, and therefore the mould surface 42 is linear in the width direction. For any region of the mould surface 42 which has no curvature along the length of the mould surface 42, that region of the mould surface 42 is planar in both the length and width directions, and not curved.

Such a mould surface 42, which is curved about an axis in one direction but which is linear, and therefore parallel to that axis, in another direction, consequently has a simple curvature in one single direction about one axial direction.

However, the mould surface 42 may additionally be curved, along the length of the mould surface 42, about an axis which is orthogonal to the mould surface 42.

Figure 14A:
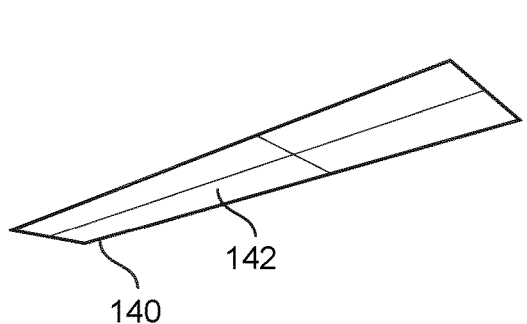
FIGS. 14a and 14b are schematic perspective views of two alternative elongate moulding tools for use in a method of manufacturing an elongate foil comprised of a fibre-reinforced resin matrix composite material in accordance with further embodiments of the present invention.
Figure 14B:
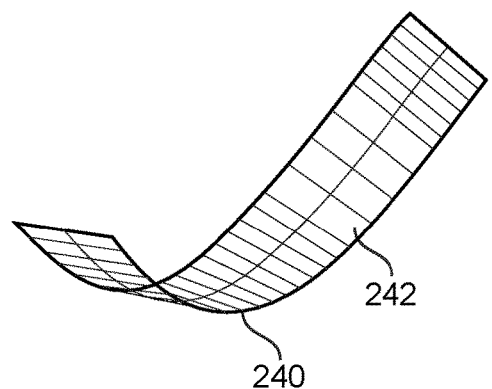
Figure 15:
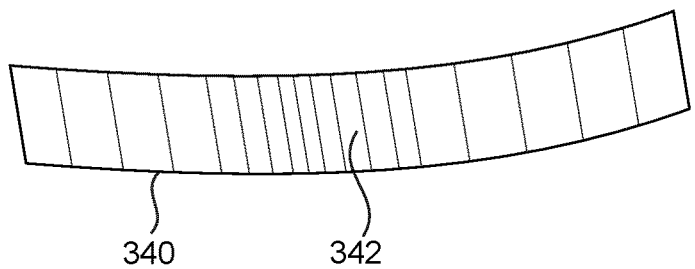
FIG. 15 is a schematic plan view of a further alternative elongate moulding tool for use in a method of manufacturing an elongate foil comprised of a fibre-reinforced resin matrix composite material in accordance with another embodiment of the present invention.

Alternative mould tools for use in the method of the present invention are illustrated in FIGS. 14*a*, 14*b* and 15. FIGS. 14*a* and 14*b* are schematic perspective views of two alternative elongate moulding tools 140, 240 which have respective mould surfaces 142, 242. In FIG. 14*a* the mould surface 142 has a rotational component about a longitudinal axis, and is thereby twisted. In FIG. 14*b* the mould surface 242 has a rotational component about a plurality of transverse axes. FIG. 15 is a schematic plan view of a further alternative elongate moulding tool 340 having a mould surface 342. The mould surface 342 is curved about an axis orthogonal to a general plane of the moulding tool 340. In each case, the curvature of the respective mould surface 142, 242, 342 is imparted to the respective elongate foil comprised of a fibre-reinforced resin matrix composite material.

Figure 6:
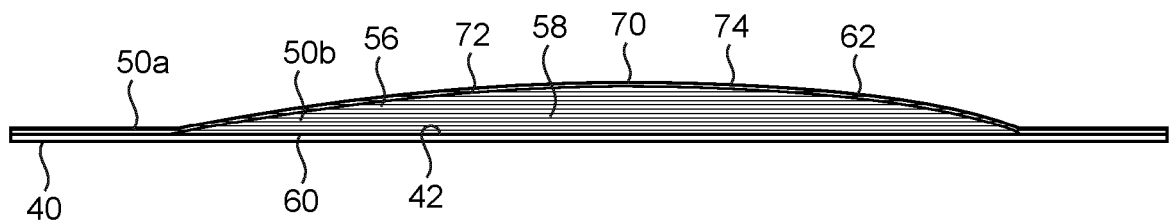
FIG. 6 is a cross-section which schematically illustrates the manufacture of a first shaped body on the elongate moulding tool of FIG. 5 in a method of manufacturing an elongate foil comprised of a fibre-reinforced resin matrix composite material in accordance with an embodiment of the present invention.
Figure 7:
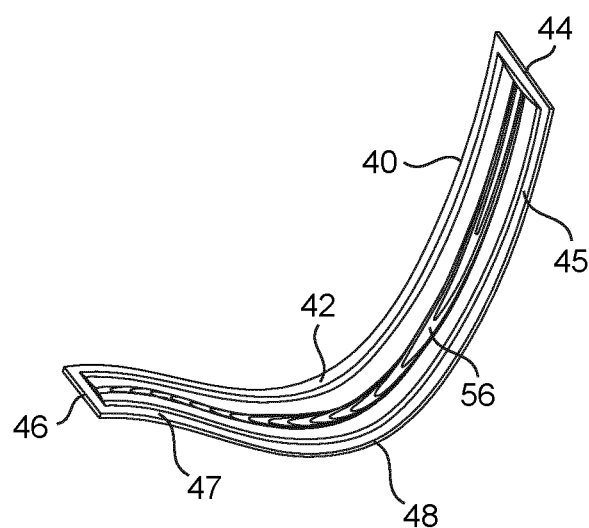
FIG. 7 is a schematic perspective view of the first shaped body of FIG. 6 on the elongate moulding tool.

The mould surface 42 may be defined by an orthogonal x-y-z coordinate system, in which the length of the mould surface 42 (to form the length of the resultant foil) is substantially along the z-direction, the width of the mould surface 42 (to form the width of the resultant foil) is substantially along the x-direction, and the y-direction is orthogonal to the x- and z-directions, and the thickness of the resultant foil is substantially along the y-direction. FIG. 6 for example shown a cross section in the x-y plane.

The mould surface 42 has primary curvature to define the fundamental structural shape of the foil in the y-z plane. At any given point along the z-direction, the mould surface 42 is linear along the x-direction. Proceeding along the z-direction, between two points along the z-direction the mould surface 42 may curve in the y-z plane about an axis which is parallel to the x-direction. This provides a simple primary curvature along the z-direction.

In addition, the mould surface may optionally also have secondary curvature, for example as illustrated in FIGS. 14*a*, 14*b* and 15. The secondary curvature may define a rotational twisting of the foil as shown in FIGS. 14*a* and 14*b* and/or a curved shape of the leading and trailing edges of the foil, i.e. the extent to which the leading and trailing edges curve forwardly or rearwardly along the length of the foil, as shown in FIG. 15.

Accordingly, for example, proceeding along the z-direction, between two points along the z-direction the mould surface 42 may independently curve along the direction. This additional secondary curvature retains the simple curvature along the z-direction as described above, since at any given position on the mould surface 42, the mould surface 42 only curves in the y-z plane, and is not required at the given position to curve about two non-parallel axes.

As described hereinbelow, the curvature of the mould surface 42 is configured to be a simple curvature so that when a preform layer is draped onto the mould surface 42, the preform layer can conform to the curved shape of the mould surface 42 by simple flexing of the preform layer about a single axis of curvature, without stretching, compression, creasing, kinking, overlapping or folding of the preform layer.

The elongate moulding tool 40 is preferably composed of a single part, but alternatively may be composed of multiple parts connected or assembled together. The elongate moulding tool 40 is typically composed of a metal, such as steel, but may alternatively be composed of a composite material, such as a fibre-reinforced resin matrix composite material.

In the method of the illustrated embodiment of the present invention, the mould surface 42 is concave along the length direction of the elongate moulding tool 40. However, in an alternative embodiment the mould surface 42 may be convex along the length direction of the elongate moulding tool 40.

A wide variety of shapes and dimensions may be utilized for the elongate moulding tool 40, depending upon the particular foil to be manufactured. For example, in the illustrated elongate moulding tool 40 for moulding a typical hydrofoil for a sailing boat, the mould surface 42 has a middle portion 48 having a first curvature, along the length direction of the elongate moulding tool 40, located between opposite end portions 45, 47. The opposite end portions 45, 47 respectively have second and third curvatures along the length direction of the elongate moulding tool 40. The first curvature has a smaller radius than, i.e. has a greater degree of curvature than, the second and third curvatures. The middle portion 48 defines an elbow-shape between the opposite end portions 45, 47.

In the method of the preferred embodiments of the present invention, as shown in FIGS. 6 to 10 a plurality of preform layers 50 are provided. As shown in the enlarged view of FIG. 10 which is not to scale, each preform layer 50 comprises at least one ply of fibrous reinforcement 52 at least partly impregnated by a resin 54. Each preform layer 50 has a respective two-dimensional shape and dimensions; the two-dimensional shape and dimensions are in a plane of the respective preform layer 50 when the preform layer is permitted to assume a planar configuration. Preferably, the preform layer 50 has a constant thickness. The thickness of the preform layer 50 is preferably within the range of from 0.1 mm to 1 mm.

Each preform layer 50 is drapable, i.e. the preform layer 50 has sufficient intrinsic flexibility that it can be draped about a given curvature to assume the shape of the curvature. As is well known to those skilled in the art, the degree of drapability, i.e. the minimum curvature about which the preform layer 50 can be draped, varies depending on the selection of the fibrous reinforcement 52 and the resin 54. The degree of drape can readily be selected by the skilled person depending upon the particular dimensions and geometry of the foil to be manufactured.

The fibrous reinforcement 52 may have any fibre configuration, and may comprise woven fibres or non-woven fibres, for example in the form of unidirectional (UD) fibres, spread tow fibres, stitched fabrics, knitted or braided fabrics. The fibrous reinforcement 52 may comprise multiple fibres with the same or different orientations. The fibrous reinforcement 52 may comprise a single ply of fibres, or alternatively may comprise a stack of plural plies of fibres, the plies having the same or different fibre, matrix and orientation configurations.

The fibres of the fibrous reinforcement 52 may comprise any natural and/or synthetic fibres. Typically, the fibrous reinforcement 52 comprises glass, carbon, and/or aramid fibres, or cotton, flax or jute fibres.

In one typical embodiment, the fibrous reinforcement 52 comprises structural fibres, for example structural fibres that are comprised in a unidirectional (UD) fibrous ply, that are aligned in parallel with the longitudinal direction of the surface of the elongate moulding tool 40.

The resin 54 may be a thermoplastic or thermosetting resin. Any thermoplastic or thermosetting resin known to be suitable for use in manufacturing fibrous preforms may be used. Typically, a thermosetting resin such as an epoxy resin is used in conjunction with glass and/or carbon fibres in the fibrous reinforcement. When a thermosetting resin is used, the preform layer 50 may comprise a prepreg, in which the fibrous reinforcement 52 is fully impregnated by the resin 54.

In the method of the preferred embodiments of the present invention, a first preform layer 50a is positioned on the mould surface 42.

Subsequently, further preform layers 50b are sequentially positioned on the first preform layer 50a to build-up an elongate first shaped body comprising a first laminated stack 58 of preform layers 50 on the mould surface 42. The first shaped body 56 has an inner surface 60 in contact with the mould surface 42.

Preferably, each preform layer 50 is shaped and dimensioned so that when the preform layer 50 is sequentially positioned to build-up the first shaped body 56 comprising the first laminated stack 58 of preform layers 50, each preform layer 50 has a peripheral edge 62 which lies within a peripheral edge 62 of the preform layer 50 located thereunder in the first laminated stack 58. However, it is possible for adjacent preform layers 50 to have peripheral edges 62 which are aligned along at least part of the circumferential length of the peripheral edges 62.

An outer foil surface 70 of the first shaped body 56, remote from the mould surface 42, has a first curved contour profile 72 along a length of the first shaped body 56 and a second curved contour profile 74 transverse to the length of the first shaped body 56. Each of the first and second curved contour profiles 72, 74 is formed by varying the number of preform layers 50 in the first laminated stack 58 at any given position along the respective contour profile 72, 74. Typically, the second curved contour profile 74 has a different shape and dimensions at different locations along the length of the first shaped body 56.

The shape and dimensions of the individual preform layers 50 to form the first laminated stack 58 are individually pre-determined and are preferably pre-cut. The present invention pre-shapes the preform layer 50 in accordance with the shape and dimensions of the laminated stack 58 to be produced, so that after building-up the preform layers 50, the desired contour profiles across 72, 74 and along the first shaped body 56 are produced in addition to the specific individual geometry of the elongate moulding tool 40. Accordingly, such pre-shaping of the preform layers 50 allows a wide variety of different contour profiles 72, 74 to be produced. Depending on the shape of the foil to be manufactured, it is possible that the intersection of the foil with parallel surfaces to the reference tooling surface leads to non-convex contour profiles.

In the illustrated embodiment, one elongate first laminated stack 58 is formed which extends along substantially the entire length of the first shaped body 56 and has opposite longitudinal ends 76, 78 which progressively decrease in thickness and opposite transverse edges 80, 82 which also progressively decrease in thickness. However, in alternative embodiments, a plurality of first elongate stacks 58 may be serially positioned alone the length, and or across the width, of the outer foil surface 70 of the first shaped body 56. In other words, the first and second curved contour profiles 72, 74 may rise to a single peak, or may undulate over a plurality of spaced peaks.

The preform layers 50 may be provided with a variety of different shapes and dimensions to enable the preform layers 50 to be built-up onto a variety of different elongate moulding tool shapes and dimensions to manufacture elongate foils of a variety of different shapes and dimensions.

Each preform layer 50 is accurately positioned on the previously positioned preform layer 50 at a precise location so that the desired contour profiles are sequentially built-up.

Figure 8:
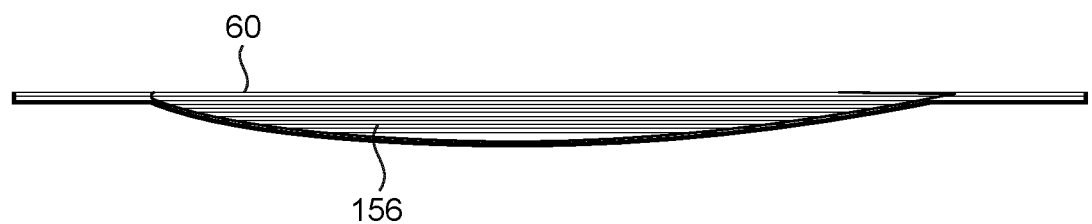
FIG. 8 is a cross-section which schematically illustrates the first shaped body of FIG. 6 after curing of the first shaped body to form a first foil part and removal of the first foil part from the elongate moulding tool of FIG. 5.

After the first shaped body 56 has been formed with the desired shape and dimensions, the first shaped body 56 is cured to form a first foil part 156 comprised of a fibre-reinforced resin matrix composite material formed from the preform layers 50. The first foil part 156 is removed from the mould surface 42 to expose the inner surface 60, as shown in FIG. 8. In FIG. 8 the first foil part has also been inverted as compared to FIG. 7.

Figure 9:
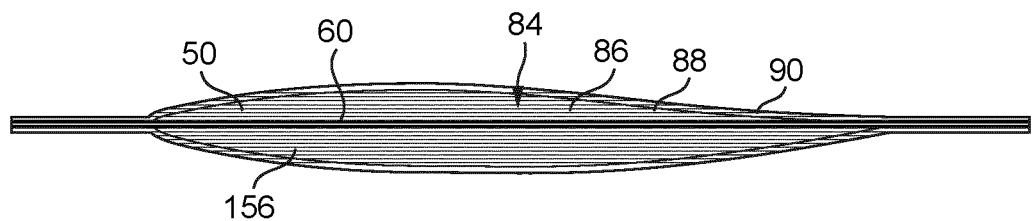
FIG. 9 is a cross-section which schematically illustrates the manufacture of a second shaped body on the first foil part formed by curing the first shaped body of FIG. 6, to form a unitary body.
Figure 10:
FIG. 10 is an enlarged side view of a preform used in the method of FIGS. 5 to 9.

Thereafter, as shown in FIG. 9 further preform layers 50 are sequentially positioned on the inner surface 60 to build-up an elongate second shaped body 84 on the first foil part 156 to form an elongate unitary body 86. The elongate unitary body 86 comprises the second shaped body 84 on the first foil part 156.

The second shaped body 84 comprises a second laminated stack 88 of preform layers 50 on the inner surface 60. The second shaped body 84 is built-up similar to the first shaped body 56 as described above.

An outer surface 90 of the second shaped body 84, remote from the inner surface 60 of the first foil part 156, has a third curved contour profile 92 along a length of the second shaped body 84 and a fourth curved contour profile 94 transverse to the length of the second shaped body 84. Each of the third and fourth curved contour profiles 92, 94 is formed by varying the number of preform layers 50 in the second laminated stack 88 at given positions along the respective contour profile 92, 94. Typically, the fourth curved contour profile 94 has a different shape and dimensions at different locations along the length of the second shaped body 84.

The unitary body 86 is curved along the length of the unitary body 86, the length being defined between opposite longitudinal ends 98 of the unitary body 86. The curvature of the unitary body 86 along the length of the unitary body 86 corresponds to the curvature of the moulding surface 42 along the length of the elongate moulding tool 40.

Figure 11:
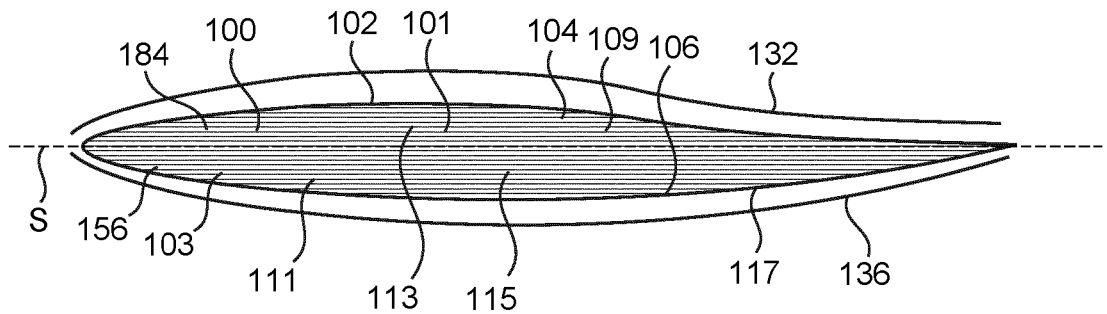
FIG. 11 is a cross-section through an elongate foil in accordance with the embodiment of the present invention which is produced using the steps shown in FIGS. 5 to 10.

The second shaped body 84, which in the elongate unitary body 86 is located on the inner surface 60 of the pre-cured first foil part 156, is then cured to form an elongate foil 100 from the unitary body 86, as shown in FIG. 11. The elongate foil 100 is fully cured. The elongate foil 100 is selected from a hydrofoil and an aerofoil, and is comprised of a fibre-reinforced resin matrix composite material formed from the preform layers. The elongate foil 100 comprises the first foil part 156 and a second foil part 158 bonded together, the second foil part 158 being formed by curing the second shaped body 84 on the first foil part 156.

It should be noted that in accordance with the method of the preferred embodiments of the present invention, the second shaped body 84, which comprises uncured preform layers 50, is moulded on the first foil part 156 which has already been cured. When the second shaped body 84 is subsequently cured to form the second foil part 158, the curing of the second shaped body 84 ensures that the bonding between the first and second foil parts 156, 158 occurs during the curing. This means that bonding is achieved by curing an uncured part on a pre-cured, which can achieve a high strength uniform bond without any trapped air at the bond line. In contrast, bonding two pre-cured parts, otherwise known in the art as blind bonding, can produce a poor bond at the bond line, and can result in undesired trapped air at the bond line.

In the preferred embodiments of the method of the present invention, the further preform layers 50 to form the second shaped body 84 are positioned directly on the inner surface 60 so that the first foil part 156 and the second shaped body 84, after curing to form the second foil part 158, are bonded together by the cured resin, resulting from the uncured resin in the preform layers 50, which as described hereinafter forms the elongate foil 2. However, in alternative embodiments an adhesive layer may additionally be applied between the second shaped body 84 and the inner surface 60 of the first foil part 156 to enhance the adhesion between the respective cured parts in the resultant elongate foil.

Before the respective curing step, optionally a coating layer, marked as 102 in FIG. 11, may be applied to the outer surface of at least one of, or both of, the first and second shaped bodies 56, 84. For example, a gelcoat layer, as coating layer 102, may be applied to the outer surface of at least one of, or both of, the first and second shape bodies 56, 84. Suitable gelcoat materials are well known to those skilled in the art of manufacturing composite materials. Additionally or alternatively, the coating layer 102 may comprise a woven or biaxial fabric to protect any underlying UD plies and prevent UD fibres from inadvertently peeling off during use.

The elongate foil 100 has opposite curved surfaces 104, 106 which are respectively formed from the outer surfaces of the first and second shaped bodies 56, 84. In the preferred embodiments of the present invention, the opposite curved surfaces 104, 106 are each curved about at least two axes which are mutually inclined, and typically the opposite curved surfaces 104, 106 are each curved about at least two axes which are mutually orthogonal.

Figure 16:
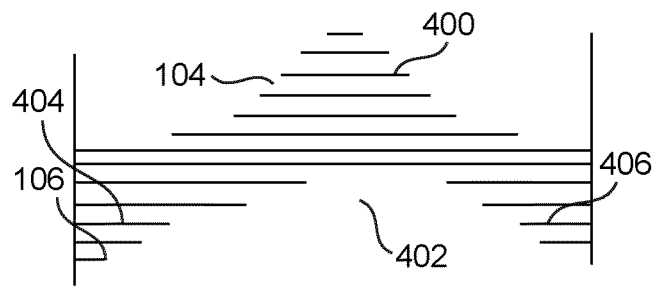
FIG. 16 is a schematic cross-section through plies of part of an elongate foil in accordance with a further embodiment of the present invention.

As shown in FIG. 16, which is highly exaggerated for clarity of illustration, the opposite curved surfaces 104, 106 (only part of which are shown) may comprise raised convex areas 400, 404, 406, or "hills", which may be separated by a lower concave area 420, or "valley". The plies of fibrous reinforcement may effectively define "contour lines" of equal height relative to the central internal surface. Such three-dimensional shaping of the opposite curved surfaces 104, 106 may extend longitudinally along and/or transversely across the opposite curved surfaces 104, 106.

Optionally, the method may further comprise a smoothing step, after the curing step, in which the opposite curved surfaces 104, 106 of the elongate foil 100 are smoothed to achieve a highly accurate final shape, dimensions and surface texture for the opposite outer foil surfaces. For example, the opposite outer foil surfaces may be smoothed by machining and/or sanding. Typically, no machining would be required if the cured elongate foil has a dimensional tolerance within +/−5% of the desired dimensions. A first smoothing step may be performed on the first foil part 156 before the second shaped body 84 is laminated thereto, and subsequently the second foil part 158 may be subjected to a second smoothing step after the curing of the second shaped body 84 to form the second foil part 158.

Figure 12:
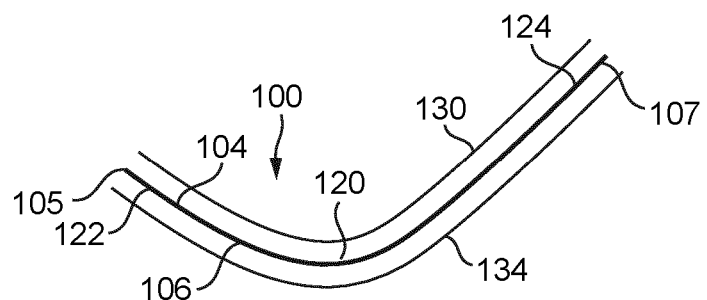
FIG. 12 is a schematic front view of the elongate foil of FIG. 11.

The preferred embodiments of the present invention can thereby provide, as illustrated in FIGS. 11 and 12, an elongate foil 100, selected from a hydrofoil and an aerofoil, comprising a body 101, typically a monolithic body, formed of laminated plies 103 of fibre-reinforced resin matrix composite material. The body 101 has a central internal surface S, extending between opposite longitudinal ends 105, 107 of the elongate foil 100, which is curved along the length of the elongate foil 100. The central internal surface S is parallel to an axis which is orthogonal to the length direction of the elongate foil 100.

In some embodiments, the central internal surface S may be coincident with the neutral axis of the elongate foil 100.

Opposite first and second side parts 109, 111 of the elongate foil 100 are bonded together at the central internal surface S. Each of the first and second side parts 109, 111 defines a respective opposite first or second foil surface 104, 106. The first and second side parts 109, 111 are preferably bonded together to form the elongate foil 100 by the resin in the resin matrix of the fibre-reinforced resin matrix composite material.

Each first and second side part 109, 111 of the elongate foil 100 comprises a respective first or second laminated stack 113, 115 of plies 103 of fibrous reinforcement. The first foil surface 104 has a first curved contour profile, generally represented by virtual line 130, along a length of the elongate foil 100 and a second curved contour profile, generally represented by virtual line 132, transverse to the length of the elongate foil 100. Each of the first and second curved contour profiles 130, 132 is formed by varying the number of plies 103 of fibrous reinforcement at positions along the respective contour profile. The second foil surface 106 has a third curved contour profile, generally represented by virtual line 134, along the length of the elongate foil 100 and a fourth curved contour profile, generally represented by virtual line 136, transverse to the length of the elongate foil 100. Each of the third and fourth curved contour profiles 134, 136 is formed by varying the number of plies 103 of fibrous reinforcement at positions along the respective contour profile.

Typically, in the first and second laminated stacks 113, 115, each ply 103 is shaped and dimensioned so that each ply 103 has a peripheral edge 117 which lies within a peripheral edge 117 of the ply 103 located thereunder, in a direction towards the central internal surface S, in the respective laminated stack 113, 115.

In the illustrated embodiment, the first foil surface 104 is concave along the length direction of the elongate foil 100 and the second foil surface 106 is convex along the length direction of the elongate foil 100. The elongate foil 100 has a middle part 120 having a first curvature, along the length direction of the elongate foil 100, located between opposite end parts 122, 124. The opposite end parts 122, 124 respectively have second and third curvatures along the length direction of the elongate foil 100. The first curvature has a smaller radius than the second and third curvatures. Typically, the middle part 120 defines an elbow-shape between the opposite end parts 122, 124.

In the preferred embodiments of the present invention, the opposite first and second foil surfaces 104, 106 are each curved about at least two axes which are mutually inclined, and are preferably mutually orthogonal.

In some preferred embodiments of the present invention, the elongate foil 100 is a monolithic body 101 consisting of laminated plies 117 of the fibre-reinforced resin matrix composite material formed from the preform layers, and optionally at least one coating layer 102 on an outer surface of the monolithic body 101. In some embodiments of the present invention, the coating layer 102 is applied to an outer surface of the monolithic body on at least one of, or both of, the first and second foil surfaces 104, 106.

Typically, the second curved contour profile has a different shape and dimensions at different locations along the length of the first foil surface 104, and/or the fourth curved contour profile has a different shape and dimensions at different locations along the length of the second foil surface 106.

In some preferred embodiments of the present invention, the first laminated stack of preform layers includes preform layers comprising different fibrous reinforcements and/or the second laminated stack of preform layers includes preform layers comprising different fibrous reinforcements. In this context, the different fibrous reinforcements may differ with respect to fibre orientation, fibre weight per unit area, weave pattern of a woven fabric forming the fibrous reinforcement, or fibre composition, or any two or more thereof.

For example, the first laminated stack of preform layers, and/or the second laminated stack of preform layers, may include at least one preform layer having a different fibrous reinforcement from at least one adjacent preform layer in the respective laminated stack. Consequently, in the resultant elongate foil, the different fibrous reinforcement can form a localized region having an increased fibre reinforcement property in the elongate foil.

Figure 13:
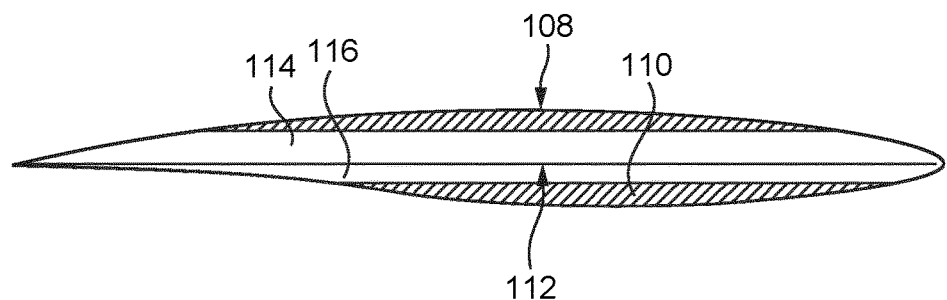
FIG. 13 is a cross-section through an elongate foil in accordance with another embodiment of the present invention.

Typically, in a further embodiment as shown in FIG. 13, the first laminated stack 114 of preform layers, and/or the second laminated stack 116 of preform layers, include a plurality of outer preform layers 108, 110 of the respective laminated stack 114, 116 having fibrous reinforcement with increased tensile strength or compressive strength as compared to fibrous reinforcement in a plurality of interior preform layers 112 of the respective laminated stack 114, 116.

In some preferred embodiments of the present invention, the elongate foil is a monolithic body consisting of laminated plies of the fibre-reinforced resin matrix composite material formed from the preform layers, and optionally at least one coating layer on an outer surface of the monolithic body.

However, in alternative embodiments of the present invention, the elongate foil comprises a central core, for example comprising a cellular foam material, to form a sandwich structure in which the core is located between opposite outer layers of fibre-reinforced resin matrix composite material. In other alternative embodiments of the present invention, the elongate foil comprises at least one central closed cavity surrounded by outer layers of fibre-reinforced resin matrix composite material.

This method of the preferred embodiments of the present invention thereby can provide a high quality composite structure in which the fibre orientations and layer configurations in the elongate foil are highly accurately controlled and consistently achieved along the entire length of the elongate foil, even though the outer surface of the elongate foil may have a complex curvature in a plurality of axial directions.

Since the preform layers 50 are built-up on the elongate moulding tool 40 which has a simple curvature, in a single curvature direction, the preform layers 50 can be laid down in parallel with the underlying moulding surface 42. This means that the preform layers 50 can accurately maintain their fibre alignment with respect to the moulding surface 42. Fibre distortion or misalignment is avoided or minimised and wrinkling of the preform layers 50 is avoided, even when non-crimp fabrics, which are hardly drapable, are used. The angles of the fibres can be precisely maintained at the desired fibre orientations.

Furthermore, since each of the first and second foil parts 156, 184 is formed from a respective first or second shaped body 56, 84 built-up from preform layers 50 subjected only to simple curvature, any wrinkles formed in the laminated stacks of preforms 50 as a result of imperfect compaction during lay-up would be removed during curing. The use of a simple curvature during curing means that compressions and tensions in the prefom lay-up can be relaxed during curing. This phenomenon enhances correct fibre alignment.

Accordingly, the present invention provides a reliable and consistent method of manufacturing composite material foils having high quality fibre orientation and fibre alignment which can be achieved using a low cost and simple manufacturing apparatus.

The method to manufacture the elongate foil comprised of a fibre-reinforced resin matrix composite material according to the present invention is not limited to the above-detailed embodiments. In particular, in further embodiments (not shown) of the present invention, the elongate moulding tool may have any combination of plan shape, dimensions and cross-sectional shape. The number of preform layers in each shaped body may be selected as desired.

Furthermore, the orientation of the fibres of the plies relative to the direction of the elongate moulding tool may be any angle suitable for providing a desired performance of the composite structure. In some preferred embodiments of the present invention, the fibre orientation may be chosen so as to form a fibre-reinforced composite structure, in a proportion (for example by weight) of unidirectional fibres having a direction along the axis of the elongate foil, which are beneficial for the main performance of the composite structure, is greater than the proportion (for example by weight) of fibres, which may optionally be unidirectional fibres, obliquely orientated relative to that direction. In some preferred embodiments of the method and elongate foil of the present invention, in the resultant foil from 50-80 wt % of the fibres are oriented at 0° relative to the longitudinal axis of the foil, to provide flexural bending stiffness to the foil, and the remaining 20-50 wt % of the fibres are oriented at 45° relative to the longitudinal axis of the foil, to provide torsional stiffness to the foil.

Accordingly, the present invention provides a reliable and consistent method of manufacturing composite material foils, such as hydrofoils and aerofoils, having complex curvature which have high quality fibre orientation and alignment which can be achieved using a low cost and simple manufacturing apparatus.

The invention claimed is:

1. A method of manufacturing a foil, selected from a hydrofoil and an aerofoil, comprised of a fibre-reinforced resin matrix composite material, the method comprising the steps of:
   a) providing an elongate moulding tool having a mould surface which extends along, and is curved along, a length direction of the elongate moulding tool, the length direction extending between opposite first and second ends of the elongate moulding tool;
   b) providing a plurality of preform layers, each preform layer comprising a fibrous reinforcement at least partly impregnated by a resin, each preform layer having a respective two-dimensional shape and dimensions;

c) positioning a first preform layer on the mould surface;

d) sequentially positioning further preform layers on the first preform layer to build-up an elongate first shaped body comprising a first laminated stack of preform layers on the mould surface, the first shaped body having an inner surface in contact with the mould surface, whereby an outer surface of the first shaped body, remote from the mould surface, has a first curved contour profile along a length of the first shaped body and a second curved contour profile transverse to the length of the first shaped body, each of the first and second curved contour profiles being formed by varying the number of preform layers at positions along the respective contour profile;

e) curing the first shaped body to form a first foil part comprised of a fibre-reinforced resin matrix composite material formed from the preform layers;

f) removing the first foil part from the mould surface to expose the inner surface;

g) sequentially positioning further preform layers on the inner surface to build-up an elongate second shaped body on the first foil part to form an elongate unitary body having a length defined between opposite longitudinal ends of the unitary body, the unitary body being curved along the length of the unitary body, wherein the second shaped body comprises a second laminated stack of preform layers on the inner surface, whereby an outer surface of the second shaped body, remote from the inner surface of the first foil part, has a third curved contour profile along a length of the second shaped body and a fourth curved contour profile transverse to the length of the second shaped body, each of the third and fourth curved contour profiles being formed by varying the number of preform layers at positions along the respective contour profile; and h) curing the second shaped body on the first foil part comprising the elongate unitary body to form an elongate foil, selected from a hydrofoil and an aerofoil, comprised of a fibre-reinforced resin matrix composite material formed from the preform layers.

2. The method according to claim 1 wherein the mould surface is parallel to an axis which is orthogonal to the length direction of the elongate moulding tool.

3. The method according to claim 1 wherein the mould surface is concave along the length direction of the elongate moulding tool.

4. The method according to claim 1 wherein the mould surface has a middle portion having a first curvature along the length direction of the elongate moulding tool, located between opposite end portions which respectively have second and third curvatures along the length direction of the elongate moulding tool, wherein the first curvature has a smaller radius than the second and third curvatures, and wherein the middle portion defines an elbow-shape between the opposite end portions.

5. The method according to claim 1 wherein the elongate foil has opposite curved surfaces which are respectively formed from the outer surfaces of the first and second shaped bodies, and the method further comprising the step, before curing step (e) or (h) respectively, of applying a coating layer to the outer surface of at least one of, or both of, the first and second shaped bodies, optionally wherein the coating layer comprises a gelcoat layer and/or a woven or biaxial fabric, and the method further comprising the step, after step (h), of smoothing the opposite curved surfaces of the elongate foil.

6. The method according to claim 5 wherein the opposite curved surfaces are each curved about at least two axes which are mutually inclined, and wherein the opposite curved surfaces are each curved about at least two axes which are mutually orthogonal.

7. The method according to claim 1 wherein the second curved contour profile has a different shape and dimensions at different locations along the length of the first shaped body, and/or the fourth curved contour profile has a different shape and dimensions at different locations along the length of the second shaped body.

8. The method according to claim 1 wherein the first laminated stack of preform layers includes preform layers comprising different fibrous reinforcements and/or the second laminated stack of preform layers includes preform layers comprising different fibrous reinforcements, wherein the different fibrous reinforcements differ with respect to fibre orientation, fibre weight per unit area, weave pattern of a woven fabric forming the fibrous reinforcement, or fibre composition, or any two or more thereof.

9. The method according to claim 1 wherein the first laminated stack of preform layers, and/or the second laminated stack of preform layers includes at least one preform layer having a different fibrous reinforcement from at least one adjacent preform layer in the respective laminated stack, whereby after step (g) the different fibrous reinforcement forms a localized region having an increased fibre reinforcement property in the elongate foil.

10. The method according to claim 1 wherein the first laminated stack of preform layers, and/or the second laminated stack of preform layers, includes a plurality of outer preform layers of the respective laminated stack having fibrous reinforcement with increased tensile strength or compressive strength as compared to fibrous reinforcement in a plurality of interior preform layers of the respective laminated stack.

11. The method according to claim 1 wherein the elongate foil is a monolithic body consisting of laminated plies of the fibre-reinforced resin matrix composite material formed from the preform layers, and optionally at least one coating layer on an outer surface of the monolithic body.

12. The method according to claim 1 wherein each preform layer is shaped and dimensioned so that when the preform layer is sequentially positioned to build-up the respective first or second shaped body respectively comprising the first or second laminated stack of preform layers, each preform layer has a peripheral edge which lies within a peripheral edge of the preform layer located thereunder in the respective laminated stack.

* * * * *